July 24, 1951  W. J. PORTER ET AL  2,561,819
DRILLING JIG
Filed June 24, 1947  2 Sheets-Sheet 1

INVENTORS
Walter J. Porter
BY Walter D. Porter
Wood, Arey, Herron & Evans
ATTORNEYS July 24, 1951   W. J. PORTER ET AL   2,561,819
DRILLING JIG
Filed June 24, 1947   2 Sheets-Sheet 2
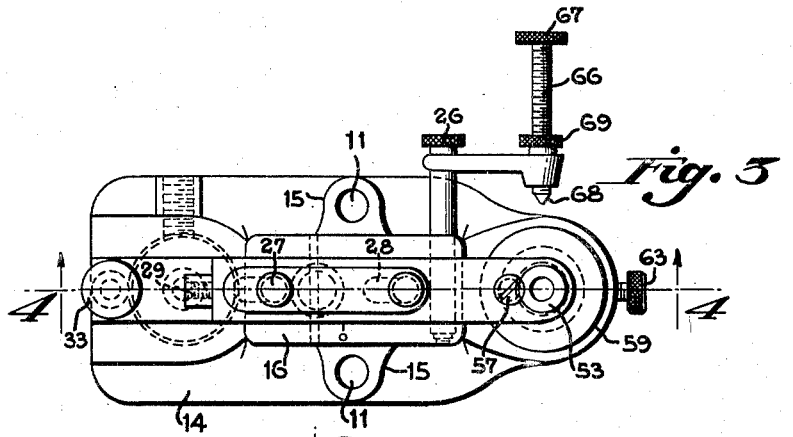
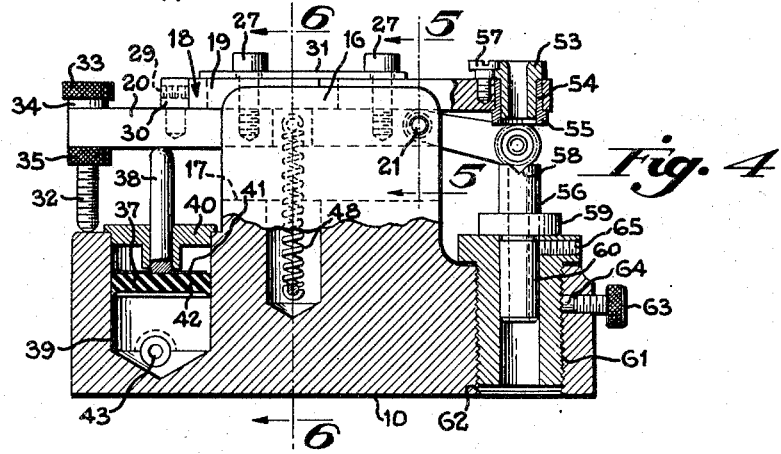
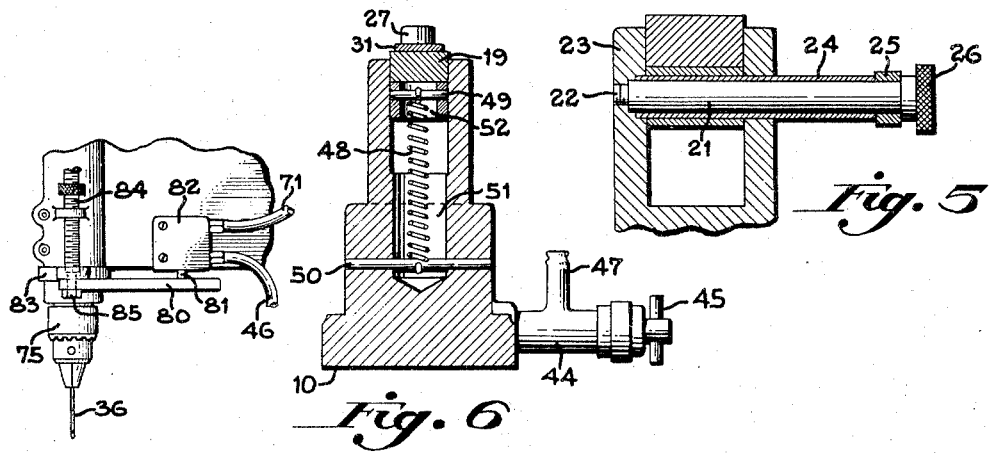
INVENTORS
Walter J. Porter
BY Walter D. Porter
Wood, Arey, Herron & Evans
ATTORNEYS Patented July 24, 1951

2,561,819

UNITED STATES PATENT OFFICE 2,561,819

DRILLING JIG

Walter J. Porter and Walter G. Porter, Cincinnati, Ohio, assignors to Porter Machine Company, Cincinnati, Ohio, a corporation of Ohio Application June 24, 1947, Serial No. 756,634

8 Claims. (Cl. 77—62)

This invention relates to machines employing rotary spindles and is particularly directed to an improved drilling jig adaptable for use in receiving and holding work blanks for drilling, tapping, or other operations in this type of machine. A drilling jig of this type is customarily employed in production operations for aligning and holding the work pieces during the rotary and axial movement of the tool relative to the work.

The drilling jig to which the present improvements are directed is employed for the purpose of quickly successively receiving and clamping small pieces of work firmly in position while the drill or tap is passed through the work pieces. In other words, the fixture must be adaptable for use in high speed production. During the process of the drilling operation, the fixture must hold the work in such manner that it is accurately and uniformly located in position and so that it cannot turn under the force of the drilling operation. Further, this type of device must be readily adjustable to accommodate work pieces of different sizes.

It has therefore been an object of the present inventors to provide a drilling jig fixture adapted for use in a drilling or tapping machine, or the like, which is so constructed that the operator may quickly and conveniently adjust the fixture to the correct position for clamping work parts uniformly and firmly in position to be drilled or tapped. In this connection, it has been a further objective to provide that the device can be quickly adjusted to convert it to use in holding work pieces of different sizes.

It has been a further object of the present inventors to provide a device of this character which can be adjusted so as to require very little movement to effect the clamping action. Proper adjustments are provided which permit the setting of the parts in position where such clamping movement may be precisely adjusted.

It has been a further object of the present inventors to provide a fixture of this character which includes a guide bushing for the drill which moves to a guiding position as the drill approaches the work and which has associated with it a concentrically related bushing liner, the end of which is effective as a work engaging surface cooperating with the V block or work support disposed adjacent thereto.

It has been a still further object of the present inventors to provide a drilling jig fixture which is operated by means of fluid pressure controlled through the operation of the drill lowering arm causing automatic clamping of the successive parts as the drill is lowered, and for bringing the drill guide bushing into co-axial alignment relative to the drill and the work support. Thus, the work is held firmly while the drill passes through it and while the drill is disposed through the guide bushing which bushing is effective for preventing undue lateral deflection of the drill.

Another object relates to the means employed for controlling the flow of air or fluid to the clamp operating piston and to the means for returning the clamping members to released position so that the work can be quickly removed from the fixture and a new piece inserted. In connection with this, it will be noted that the fixture is entirely automatic with the exception of the insertion and removal of the work. The operator is merely required to insert the part and remove it.

These objects have been accomplished in a structure which employs a minimum number of parts. In the preferred embodiment, the device consists of a base, a clamping beam or arm, an air actuated piston for actuating the arm and, appropriate clamping elements adjacent the clamping end of the arm. These clamping elements include a V block, or work support, which may be raised or lowered and a drill guide bushing in the clamping beam disposed within a lining element, the lower end of which cooperates with the work support to grip the work. The premilinary setting of the clamping arm and the control of its clamping movements are brought about by means of a leveling screw associated with the clamping beam. The device is spring-returned after the air operated clamping means is relieved from air pressure. Control for the jig is accomplished through the movements of the drill lowering arm, this arm operating an air valve which in turn admits the air to the jig through an air flow control valve adjusted to admit the air at the correct speed.

Certain other objects and advantages of the invention will be more fully apparent from a description of the accompanying drawings in which:

Figure 3 is a top plan view of the drilling jig.

Figure 4 is a sectional view taken partially on line 4—4, Figure 3, this view illustrating certain of the details of the base member and the elements mounted therein.

Figure 5 is a sectional view taken on line 5—5, Figure 4, illustrating the construction and mounting of the pivot pin for the clamping beam.

Figure 6 is a sectional view taken on line 6—6, Figure 4, illustrating the mounting of the return spring for the clamping beam.

Figure 7 is a fragmentary view taken similar to Figure 1 but showing a modified form of valve and valve operating means associated with the drill spindle.

Figure 1:
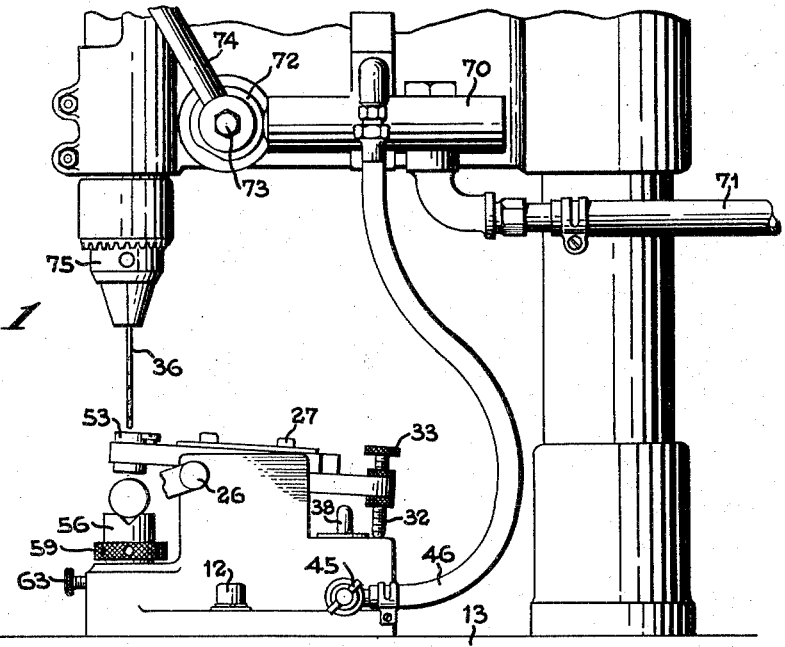
Figure 1 is a fragmentary side view of a portion of a drilling machine showing the drilling jig of this invention mounted in relation thereto, the fixture being shown in position with the work unclamped.

Described in general, the present embodiment of the invention includes a base, a clamping beam pivoted on the base, an air-operated piston for actuating the clamping beam, and means for gripping and locking the work in the jig. The delivery of air to the air-operated piston is controlled by a valve located on the drilling machine and actuated by means of the lever which mechanically lowers the drill for drilling the work. In other words, as the drill is brought down to pass it through the work, the clamping beam is actuated by air, controlled through the aforesaid valve, to rock the beam on its pivot into position where it clamps the work and simultaneously aligns the guide bushing for the drill.

The exact construction of the disclosed embodiment of the drilling jig itself is as follows. The principal element of the jig is the base 10 which consists of a casting appropriately machined to support the various working parts. The base includes vertical bores 11 through which attachment screws 12 are passed for securing the base and the entire drilling jig to the table 13 of the drilling machine. The base includes a flange 14 through which the bores 11 are formed. These bores include the usual raised bosses 15 surrounding them. The base includes a central raised or elevated portion 16. A longitudinal slot 17 is machined in the top of this base. This slot has considerable depth so as to provide clearance for the pivotal motions of the clamping beam which is mounted for guided movement within it.

The clamping beam 18 consists of two parts 19 and 20, respectively upper and lower, this arrangement being utilized so as to provide for longitudinal adjustment of one part upon the other so as to align the drill guide bushing with the work holder. The lower element 20 of the clamping beam is mounted on a pivot pin 21 disposed through the main casting or base element 10 and through the lower element 20 at its forward end. This pivot pin permits downward movement of the work end of the beam assembly when upward motion is delivered to the rearward end of the beam assembly as described hereinafter. It will be noted that on the end of this pin, opposite to that end which traverses the casting and the beam, there is provided a counterturned portion upon which is mounted means for adjusting the work horizontally. Therefore, although this pivot pin has for its main purpose the mounting of the beam relative to the base, it has the added function of providing a means for mounting a work locating device.

Reference to Figure 5 may be had for a full understanding of the structure and mounting of the pivot pin. It will be noted that its extreme inner end includes a counterturned screw threaded portion 22 screwed into fixed position in the wall 23 of the base adjacent the slot 17. A spacer and bearing sleeve 24 are mounted on the pin, this sleeve passing through the walls of the base adjacent the slot through the bore in the end of the lower element of the beam and partly into the wall 23. This element provides the bearing surface for pivotal movement of the beam and its outwardly extended end provides the means for spacing the work locating arm 25 relative to the base. A knurled clamping nut 26 is screwed on the end of a pivot pin and is effective for clamping the arm against the end of the spacer sleeve for securing the arm in any position of rotative adjustment.

The elements 19 and 20 of the beam are secured together by means of two screws 27—27. These screws traverse elongated slots 28 in the upper element of the beam and are screwed into the lower element of the beam. Thus, longitudinal or horizontal adjustment of the upper beam element on the lower is permitted. This adjustment is accomplished by means of an adjustment screw 29 disposed horizontally through block 30, the block in fact being the head of a screw threaded into a vertical bore in the lower element. This block is located adjacent the end of the upper element away from the work clamping end and the screw 29 engages the end of the upper element. Thus, by adjusting the screw 29, the upper element may be moved on the lower element for changing the relationship of the work engaging end of the upper element relative to the pivot of the beam assembly. It will be observed that the slot 17 in the base constitutes an effective guide for both the pivotal movements of the beam for the adjustment movements just described.

In order to avoid clogging of the elongated slots 28 through the entrance of chips, a cover plate or hold-down strip 31 is located upon the top of the upper element and includes apertures traversed by the screws 27. This strip effectively covers both of the slots and the upper element may be moved readily when the screws 27 are loosened, the element sliding between the hold-down plate and the lower beam element.

At the rear end of the beam, specifically through the lower element thereof, there is provided a vertically disposed leveling screw 32 which is screw-threaded in an aperture in the beam element. This leveling screw includes a knurled head 33 having a spacer shoulder 34 which engages the upper surface of the beam element. A knurled lock nut 35 is provided on this leveling screw and this in turn engages the under side of the beam element. The purpose of this leveling screw is to permit the operator to adjust the beam to a position exactly parallel with the base, that is, into an exact horizontal position, as shown. Such adjustment will automatically bring the center line of the drill guide bushing at the front end of the beam to a position perpendicular to the base or in exact axial alignment with the drill, the drill being shown at 36.

The clamping beam is actuated by means of a piston 37, the rod 38 of which extends upwardly and is rounded to contact the under side of the beam. The base of the jig includes a vertical bore 39 within which the piston 37 is slidably mounted. The piston rod reciprocates freely within a cap element 40 for the cylinder. This cap element is pressed into the top of the bore constituting the cylinder and therefore, plugs the opening at the top of the bore. At the same time, it acts as a guide for the piston rod and stabilizes it in its movements. The piston rod has a thin steel washer 41 fixed to its lower end, this washer acting as a backing plate for the soft rubber piston head 42, providing that the air pressure is evenly distributed and efficiently applied up through the rod 38 which delivers the force to the beam assembly.

Figure 2:
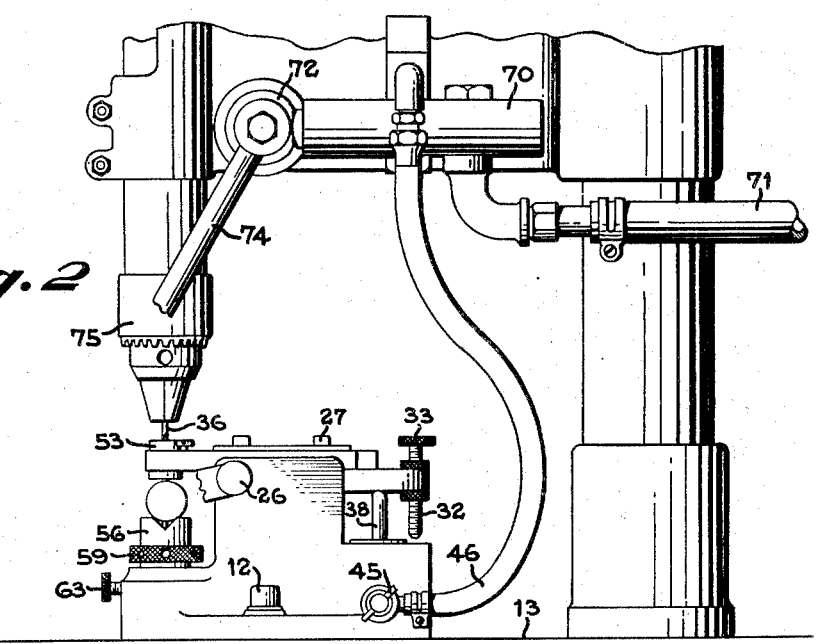
Figure 2 is the view taken in the same manner as Figure 1 but showing the work in clamped position.

The air under pressure is delivered to the cylinder bore 39 by way of a lateral passage 43 entering the base of the bore. To control the flow of air into this passage 43, a conventional air flow control valve 44 (Figure 6) is screwed into the passage. There is no necessity for describing the details of this valve. A description of its purpose will suffice. This purpose is to control the flow of air into the cylinder by the adjustment of the valve. The adjustment valve stem is indicated at 45. Thus, by an accurate adjustment, unduly fast action of the piston is prevented since this would cause pounding when the jig is in operation. By controlling the speed of entrance of the air, the clamping and unclamping of the work in the jig can be softened to obtain substantially the action of hydraulics. The air line 46 (Figure 1) is connected to a nipple 47 on the valve. For convenience of illustration, the valve has been swung, in Figure 6, to bring the nipple upwardly although its actual position is as shown in Figures 1 and 2.

In order to return the beam to work unclamping position, a spring 48 is provided. This coil spring is disposed under tension between a short pin 49 ((Figure 6), passing horizontally through the central portion of the lower beam element, and a pin 50 disposed horizontally through the base. The base includes a clearance bore 51 and the lower element of the beam includes a clearance bore 52. The spring includes terminal hooks of conventional type. The effect of the spring normally is to return the beam to position where the leveling screw is in contact with the base and the piston has been returned to starting position. The spring is of sufficient strength to accomplish these actions and to thoroughly exhaust the air from the cylinder back through the air line through the normal exhaust port of the control valve located on the drilling machine.

The clamping parts of the drilling jig are located at its forward end. The forward end of the beam carries a drill guide bushing element 53, this bushing, including a bore of sufficient diameter, to afford the proper clearance for the drill and at the same time prevents undue lateral displacement of the drill as it passes into the work. The drill guide bushing is telescopically mounted within, and is co-axially disposed relative to, a bushing liner member 54. This liner is fixed in position in the forward end of the beam and includes a head portion 55 which is downwardly disposed and which is utilized as the work engaging member. When the work blank is inserted in the work support or V-block 56, this bushing liner is brought down against the work at a pressure proportionate to the amount of air actuating the piston. While the work is securely gripped by the head of the bushing liner, the drill is brought down through the guide bushing and passes through the work blank. In the meantime, this bushing liner is continually exerting a clamping pressure against the work.

The drill guide bushing element 53 is secured in position by means of a clamping or set screw 57 secured into the top of the beam adjacent the drill guide bushing and having its head engaged in an arcuate recess in the head of the drill guide bushing. The work rest or the V-block member 56 is tubular and consists of the upper V-slotted portion 58, an intermediate shoulder 59, and a centering stud portion 60. An elevating screw 61 is threaded into the screw threaded bore 62 of the base. This element makes available a fine vertical adjustment to permit elevation of the work holder or rest to whatever height is required to suit the diameter or thickness of the work to be drilled. The elevating screw, after adjustment, is set in position by means of a locking screw 63 having a knurled head and screwed into a horizontal bore in the base. This locking screw engages a clamping and locking shoe 64 disposed against the elevating element. The locking shoe is made of brass and is a softer metal so as to prevent damage to the threads of the elevating element when clamped thereagainst.

The V-block or clamp element 56 is locked in any adjusted angular position by means of a set screw 65 screwed horizontally into the head of the elevator screw and engaging the stud portion of the V-block. It presents rotative displacement of the block which might result from the torque imparted to the block by the cutting resistance as the drill rotates through the work. The work support or V-block may be of various forms. It need not be as indicated on the drawing but may be varied in size and length to suit the requirements of the job. Its purpose, as stated, is to lock and steady the work blank and to act as the lower abutment to permit the work to be clamped between it and the bushing liner.

The work locating arm 25, as stated, is pivotally mounted for swinging movement on the end of the pivot pin 21. The outer end of the arm is drilled and tapped to receive an adjustable screw 66. The screw 66 has a knurled head 67 and is fine pitch threaded throughout its entire length. Its point 68, which engages the end of the work blank, may be adjusted with precision against the end of the work to dispose the work in any desired horizontal position with respect to the drill guide bushing. In other words, this element is set in position so that the hole will be drilled in the work blank at the proper distance from the end of the work. Once the arm has been set, it is only necessary for the operator to place the end of each work blank against the headed end 68 of the screw and the holes are drilled uniformly distant from the ends of the work pieces. A lock nut 69 is provided for securing the work locking screw in any adjusted position.

As shown in Figures 1 and 2, the air line 46 extends down from a control valve 70 fixed to the upper part of the machine, this valve being supplied with air from any suitable source through line 71. The valve 70 is operated by means of a cam 72 attached to the shaft 73 through which the drill is lowered by means of a handle 74. The drilling machine includes the usual chuck 75 which carries the drill 36. Figure 1 shows the drill in upper position with the valve 70 closed. In Figure 2, the handle has been swung downwardly to pass the drill through the work. Just as the drill enters the work, the cam 72 is effective for opening the valve 70 and causing the piston to move the clamping beam of the fixture to clamping position.

A modified form of valve and valve operation (Figure 7) is disclosed. An arm 80 is fixed to the spindle and extends laterally relative thereto. This arm is adapted, when the drill spindle is at its upper limit, to contact the valve plunger 81 of a valve 82 fixed to the arm which carries the drill spindle. As shown, this arm is effective for closing the valve. The type of valve used in this form will normally, in the absence of engagement by the arm, be open. A clamp 83 is fixed around the spindle and this clamp provides a boss through which is mounted the standard depth stop screw 84 found in the conventional machine. The nut 85 on the lower end of this depth stop screw holds the bar against the under side of the clamping element, and secures it in fixed position with respect to the spindle. Thus it will be apparent that the moment the drill starts downwardly the air immediately flows to the piston in the jig and the work is clamped and the drill guide bushing is properly aligned.

Operation of the jig

As stated, the jig is in the position shown in Figure 1 when the work is inserted in position and when the drill is lowered. In the drilling operation, the air is admitted to the fixture to bring the clamping beam to horizontal and clamping position and to align the drill guide bushing 53 with the drill 36.

In setting up the jig for any given operation, the operator proceeds as follows. First of all, he screws the leveling screw 32 securely against the top surface of the clamping beam and fixes it in this position. The length of the screw is such that this will automatically dispose the clamping beam assembly in parallelism with the base of the unit, that is to say, places the drill guide bushing 53 in exact co-axial alignment with the center of the work holder or V-block 56 so that the drill can pass through the work and through the bore of the work support or V-block while being supported against undue lateral deflection. Thus, it is possible in this arrangement and when the parts are thus set up to use the bottom of the liner bushing as a reference point for fast conversion of the jig to work blanks of different diameters. When the parts are in this position, the elevating screw 61 is rotated to bring the V-block up against the under side of the particular piece of work which is to be drilled. The elevating screw is rotated for this purpose and when the work is held between the bottom of the liner bushing and the V-block, the set screw 63 holding the elevating screw in position, is tightened. The V-block can, of course, be rotatively adjusted to procure the proper angular adjustment. Also, at this time, the screw 66 which adjusts the work horizontally is manipulated to place the work so that the drill will pass through the point on the work intended.

In the matter of conversion from one work blank size to another, let us say from quarter-inch to half-inch round stock, the procedure is as follows. First, the elevating screw 61 is rotated to its lowest position. The leveling screw 32 is then screwed down tight against the clamping beam. The new diameter work blank, let us say half-inch round, is then laid in the V-block and the elevating screw 61 is turned counter-clockwise along with the V-block carrying the work blank upwardly until the top side of the work contacts the under side of the liner.

The leveling screw is then backed away from the clamping beam to provide clearance for whatever beam motion is desired and which will permit removal of the work from between the liner bushing and the top of the V-block. It will be observed that the leveling screw serves two functions. In the first place, it permits the clamping beam assembly to be set parallel for setting up the jig for a new job. In the second place, the lower end of the leveling screw, which is adjustable, acts as an abutment against the base for controlling the amount of angular motion desired to be imparted to the clamping beam assembly.

When these adjustments have been made, it is obvious that operation of the drill lowering lever will bring about clamping and alignment of the drill guide bushing just prior to the time that the drill passes through the guide bushing and the work. Promptly upon release of the drill lowering lever, the spring will be effective for releasing the work and it can be quickly removed from position and a new piece inserted.

Having described our invention, we claim:

1. A drill jig fixture comprising, a body, a clamping beam pivotally mounted on said body, means for swinging said clamping beam to clamping position, a work support block mounted on the body beneath the other end of said clamping beam, means for raising and lowering said block, a drill guide bushing fixed in the clamping beam adjacent the block and in alignment therewith, a bushing liner fixed in the clamping beam for supporting said drill guide bushing within its bore, the lower end of said liner adapted to engage the work blank against the block when the clamping beam is actuated to clamping position, spring means for normally returning the clamping beam to unclamped position when the clamping pressure is discontinued and a leveling screw, said leveling screw adjustably mounted in the clamping beam for changing the position of its lower end relative to abutment with the body, said screw being of a proper length to dispose the axis of the drill guide bushing at right angles to the base of the body when the screw is fully screwed down through the clamping beam.

2. In a drill jig fixture, a body having a raised portion, a clamping beam pivotally mounted in said raised portion, a leveling screw disposed through one end of said clamping beam and adapted to be adjusted relatively thereto, said leveling screw when adjusted to its lower limit adapted to engage the body and dispose the clamping beam parallel thereto, means for actuating said beam in a clamping direction, means for urging said clamping beam in an unclamping direction, an elevating screw mounted in the body beneath an endwise portion of said clamping beam, a work support rotatably mounted in said elevating screw, and a drill guide bushing mounted in the clamping beam at right angles thereto over said work support, and, a bushing liner disposed around the drill guide bushing within the clamping beam and having its lower end disposed for engaging a work blank against the work support.

3. A drill jig for accommodating workpieces of various sizes, comprising, a base having a flat bottom surface adapted for disposition upon a work table of a drilling machine, a V-block mounted in said base and having a work supporting surface parallel to the bottom surface of the base, said V-block being adjustable longitudinally along an axis at right angles to the bottom surface of the base, an arm pivotally mounted on the base and having a portion overhanging said V-block, a drill bushing mounted in said overhanging portion of the arm in such position that the axis of its bore is in alignment with the axis of movement of the V-block when the axis of the drill bushing is at right angles to the base, releasable leveling means locating the arm against pivotal movement when the drill bushing is in such position of alignment with respect to said V-block, whereby a clamping engagement may be established between said arm and work carried by said V-block upon adjustment of the V-block, and means for pivotally moving said arm to carry the drill bushing thereof toward said V-block upon release of said releasable leveling means.

4. A drill jig for accommodating workpieces of various sizes, comprising, a base having a flat bottom surface adapted for disposition upon a work table of a drilling machine, a V-block having a work supporting surface parallel to the bottom surface of the base, screw-threaded adjustment means intermediate the V-block and the bore for raising and lowering the V-block along an axis at right angles to the bottom surface of the base, an arm pivotally mounted on the base and having a portion overhanging said V-block, a drill bushing mounted in said overhanging portion of the arm in such position that the axis of its bore is in alignment with the axis of movement of the V-block when the axis of the drill bushing is at right angles to the base, releasable leveling means locating the arm against pivotal movement when the drill bushing is in such position of alignment with respect to said V-block, whereby a clamping engagement may be established between said arm and work carried by said V-block upon adjustment of the V-block, and means for pivotally moving said arm to carry the drill bushing thereof toward said V-block upon release of said releasable leveling means.

5. A drill jig for accommodating workpieces of various sizes, comprising, a base having a flat bottom surface adapted for disposition upon a work table of a drilling machine, a V-block mounted in said base and having a work supporting surface parallel to the bottom surface of the base, said V-block being adjustable longitudinally along an axis at right angles to the bottom surface of the base, an arm pivotally mounted on the base and having a portion overhanging said V-block, a drill bushing mounted in said overhanging portion of the arm, means for adjusting the position of the bushing longitudinally of said arm to position the axis of its bore in alignment with the axis of movement of the V-block when the axis of the drill bushing is at right angles to the base, releasable leveling means locating the arm against pivotal movement when the drill bushing is in such position of alignment with respect to said V-block, whereby a clamping engagement may be established between said arm and work carried by said V-block upon longitudinal adjustment of the V-block, and means for pivotally moving said arm to carry the drill bushing thereof toward said V-block upon release of said releasable leveling means.

6. In a drill jig fixture having a body, a clamping beam pivotally mounted in said body, a work support adjustably mounted in said body beneath said clamping beam for movement along an axis toward and from said clamping beam, and a drill bushing mounted in said clamping beam in such position that the axis of its bore may be brought into alignment with the axis of movement of said work support upon pivotal movement of said clamping beam, a leveling device associated with said clamping beam, adapted to locate the clamping beam in a predetermined position in which the axis of the drill bushing is in alignment with the axis of movement of the work support, and means associated with said leveling device for holding the clamping beam against pivotal movement away from said work support when said clamping beam is in such predetermined position.

7. In a drill jig fixture having a body, a clamping beam pivotally mounted in said body, a work support adjustably mounted in said body beneath said clamping beam for movement along an axis toward and from said clamping beam, and a drill bushing mounted in said clamping beam in such position that the axis of its bore may be brought into alignment with the axis of movement of said work support upon pivotal movement of said clamping beam, a leveling screw in threaded engagement with said clamping beam and adapted to abut a portion of said body, said screw upon adjustment to a given position being effective to locate and support the clamping beam in a predetermined position in which the axis of the bore of the drill bushing is in alignment with the axis of movement of the work support.

8. In a drill jig fixture having a body, a clamping beam pivotally mounted in said body, a work support adjustably mounted in said body beneath said clamping beam for movement along an axis toward and from said clamping beam, and a drill bushing mounted in said clamping beam in such position that the axis of its bore may be brought into alignment with the axis of movement of said work support upon pivotal movement of said clamping beam, a leveling screw disposed through one end of said clamping beam and adapted to be adjusted relative thereto, and a stop constituting an abutment for the end of said screw, said leveling screw, when adjusted to its lower limit, adapted to engage said stop and dispose the clamping beam in a predetermined position in which the axis of the bore of the drill bushing is in alignment with the axis of movement of the work support.

WALTER J. PORTER.
WALTER G. PORTER.

REFERENCES CITED

The following references are of record in the file of this patent:

UNITED STATES PATENTS

| Number | Name | Date |
|---|---|---|
| 971,556 | Petersen | Oct. 4, 1910 |
| 1,060,477 | Meyers | Apr. 29, 1913 |
| 1,701,644 | Stull | Feb. 12, 1929 |
| 1,715,380 | Onsrud | June 4, 1929 |
| 1,921,721 | Batterman et al. | Aug. 8, 1933 |
| 2,349,142 | Christenson | May 16, 1944 |